United States Patent

Perrault et al.

[15] 3,641,494

[45] Feb. 8, 1972

[54] BIDIRECTIONAL DATA TRANSMISSION SYSTEM WITH ERROR CORRECTION

[72] Inventors: Jean Perrault, Port Marly; Adelin E. G. Salle, Versailles, both of France

[73] Assignee: International Standard Electric Corporation, New York, N.Y.

[22] Filed: Feb. 12, 1970

[21] Appl. No.: 10,837

[30] Foreign Application Priority Data

Feb. 14, 1969 France....................................6903551

[52] U.S. Cl. ..........................................340/146.1, 178/23 A

[51] Int. Cl. .......................................G08c 25/00, H04l 1/10

[58] Field of Search .........................178/17.5, 23 A; 325/41; 179/1 CN; 340/146.1 BA, 146.1 AL

[56] References Cited

UNITED STATES PATENTS 3,471,830 10/1969 McRae et al........................340/146.1

3,475,723 10/1969 Burton et al........................340/146.1

3,452,330 6/1969 Avery.................................340/146.1

*Primary Examiner*—Kathleen H. Claffy

*Assistant Examiner*—Horst F. Brauner

*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A bidirectional data transmission system for transmitting information between two terminal stations incorporating in each terminal station an arrangement for checking the received data and providing error correction when errors are detected in the received data. Each of the terminals include a memory for storing the *m* last words transmitted from that terminal. When an error is detected in one terminal, the transfer of received data to a data processor is blocked and a repetition request word is generated and transmitted to the other terminal. The other terminal detects the presence of the repetition request word in the received data and transmits a repetition start word and the last *m* data words stored in the memory to said one terminal to accomplish the error correction.

7 Claims, 34 Drawing Figures

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

Inventors
JEAN PERRAULT
ADELIN E. G. SALLE
By Alfred C. Hill
Agent

BIDIRECTIONAL DATA TRANSMISSION SYSTEM WITH ERROR CORRECTION

BACKGROUND OF THE INVENTION

The present invention relates to a bidirectional data transmission system for transmitting information between two terminal stations and more particularly to such a transmission system incorporating in each terminal station an arrangement for checking the received data and providing error correction when errors are detected in the received data.

SUMMARY OF THE INVENTION

In order to carry out the checking in accordance with the principles of this invention, $n2$ parity digits are added to each group of $n1$ digits or "word," and these words of $n=n1+n2$ digits or "C*hr*" words are transmitted while retaining in a memory MR the $m$ last transmitted words.

The C*hr* words are of several types and distinction is made between:

The information words C*cr* constituted by the data to be transmitted,

The repetition words C*rd* and C*rs* used in case of error of transmission, and

The synchronization words C*sy* transmitted in the absence of any other words.

In the receiving terminal—terminal TB for instance—if one or several errors are detected in a received word—the word (C*hr*)*j* for instance—the transfer of the received words to the data processing unit associated to said terminal is blocked. In addition, a "repetition request" word C*rd* is sent to terminal TA and, simultaneously, an alarm counter and a repetition counter are activated in terminal TB, and they both advance by one position at each word time.

When this word C*rd* is decoded in terminal TA, the normal transmission of the words is stopped, and a "repetition start" word C*rs* is sent and is followed by the contents of memory MR. When this word C*rs* is decoded in terminal TB, the advance of the alarm counter is stopped. At the following word times, the $m$ repeated words are successively received and the repetition counter delivers a signal indicating the end of repetition at the $m$th word time which follows the time of detection of the erroneous word, said $m$th word time corresponding to the time of reception of the repeated word (C*hr*)*j*-At the next word time, at which the repeated word (C*hr*)*j* is received, the transfer of the words to the data processing unit is once again authorized and normal operation is resumed.

Therefore, an object of the present invention is to provide a bidirectional data transmission system in which the errors detected on reception are corrected by repetition.

A feature of this invention is the provision of a bidirectional data transmission system including two terminal stations in bidirectional communication with each other having error correction capability comprising first means disposed in each of the stations to process data words before transmission and after reception; second means disposed in at least one of the stations to store the last $m$ data words transmitted, where $m$ is an integer greater than one; third means disposed in at least the other of the stations to receive the data words from the one of the stations and to detect errors in the received data words; fourth means disposed in at least the other of the stations coupled to the third means and the first means responsive to a detected error in the received data words to block the received data words from the first means and to provide for transmission to the one of the stations a repetition request word; and fifth means disposed in at least the one of the stations coupled to the second means responsive to the repetition request word received from the other of the stations to provide for transmission to the other of the stations for error correction therein a repetition start word and the last $m$ data words.

Another feature of this invention is the provision of the third means and the fourth means also being disposed in the one of the stations and the second means and the fifth means also being disposed in the other of the stations to provide error correction capability for the other direction of data transmission.

Still another feature of the invention is the provision of means for controlling, when an error has been detected in terminal TB (TA) in an information word C*cr*, the blocking of the data transfer to a data processing unit QP–B, and means for transmitting repetition request word C*rd* and for starting a repetition counter KC and an alarm counter KA which advance by one position at each word time.

A further feature of the invention is the provision of, in each terminal, means for storing the $m$ last-transmitted words in a memory MR and means for controlling, at the reception of a word C*rd*, the transmission of a repetition start word C*rs* followed by the $m$ words stored in memory MR.

Still a further feature of the invention is the provision of, in terminal TB (TA), means for generating a signal R*s* at the reception of a word C*rs*, means for controlling, with this signal R*s*, the blocking of the advance of counter KA which thus measures the time interval between the detection of the error and the reception of the repeated words, means for transmitting an alarm signal when said counter KA is not blocked after a time interval of ($k$–1) word times, and means for unblocking the transfer of data to the unit QP–B when the counter KC, which measures the time interval between the last words which was correctly received and the reception—in repetition—of the word which was erroneous, reaches a position characterizing the $m$th word time after the error detection.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
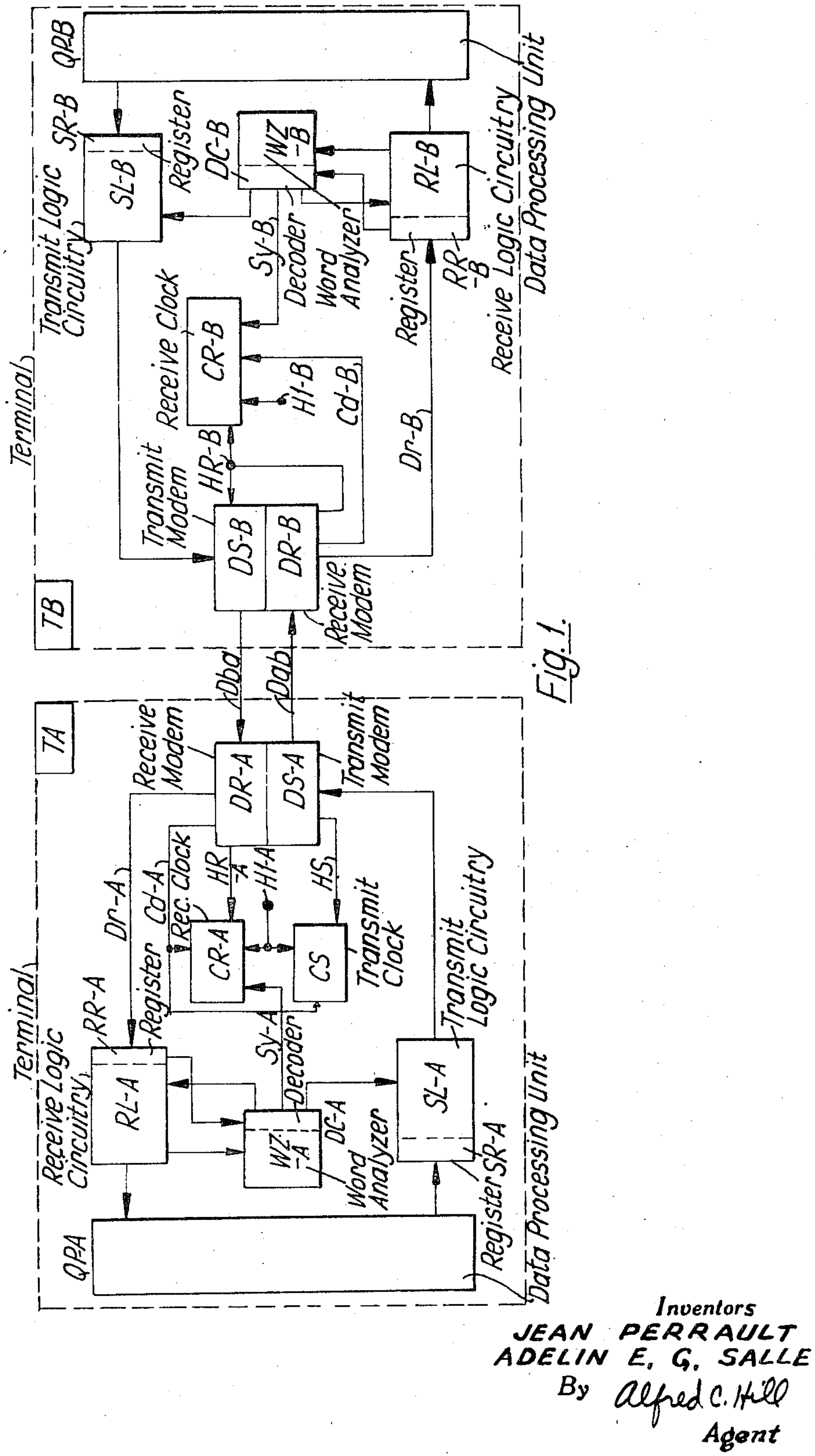
FIG. 1 is a general block diagram of the data transmission system according to the principles of the present invention.

In order to facilitate the description, the specification will be divided as follows:

1. Description of the System
   - 1.1—General diagram (FIG. 1)
   - 1.2—Time control circuits (FIGS. 2, 3, 4 and 5)
   - 1.3—Word analyzer (FIG. 6)
2. Principle of Operation (FIGS. 7 and 8)
3. Receive Logic Circuitry (FIG. 9)
   - 3.1—General outline 3.2—Parity circuit (FIG. 10)
3.3—Error detection circuit (FIG. 11)
3.4—Repetition control circuit
4. Transmit Logic Circuitry (FIG. 9)
4.1—General outline
4.2—Priority circuit (FIG. 12)
4.3—Input and output logic circuits (FIGS. 9 and 13).

It should be noted that in the detailed block diagrams the AND, OR, and EXCLUSIVE OR circuits do not carry any reference character, since they are defined without any ambiguity by the signals applied to them and by the corresponding logic conditions grouped in the various tables.

It should be noted in addition that the identical components in the terminals TA and TB of the system of FIG. 1 have the same reference characters followed by a letter A or B. This letter identifies whether the component is in terminal TA or TB. Where the description is concerned with a component that can be in either terminal TA or TB, the letter A or B will be dropped, since the description is applicable to the component regardless of the terminal in which it is located.

1—Description of the System 1.1—General diagram

FIG. 1 illustrates the general block diagram of the data transmission system according to the principles of the present invention. This system assures the bidirectional transmission of data between the two data processing units QP–A and QP–B or between such a unit and a peripheral or input-output circuit associated to it.

The assembly of one data processing unit and the circuits controlling the transmission constitutes a terminal TA or TB.

These terminals, which are practically identical, are connected together by the transmission channels D*ab* and D*ba*. For each transmission channel, the signals are transmitted by a transmit modem DS and are received by a receive modem DR. As is well known, these modems DS and DR control the conversion, in the two directions of transmission, of PCM (pulse code modulation) signals into modulated signals by a process such that the transmission over the lines D*ab* and D*ba* is optimized with regard to the transmission speed and the quality. The above-mentioned PCM signals are delivered by the units QP and by the circuits which are associated with them. By way of an example, the modulation process may be that known as "frequency shift modulation."

In each terminal, the information to be transmitted, supplied by data processing unit QP, is stored in register SR of transmit logic circuitry SL. In this circuitry, the information is processed, sent to the transmit modem DS and transmitted towards the other terminal.

The words received in a terminal are transferred, after decoding in the receiver modem DR, to register RR of receive logic circuitry RL. These words are applied to word analyzer WZ which delivers signals identifying the type of word which has been received.

A word comprises 10 digits *b*1, *b*2 . . . *b*10, wherein *b*9, and *b*10 are parity digits. The different types of words are presented in Table 1.

TABLE 1

Types of words Chr

| Reference | Priority level | Type of word | Signal delivered by decoder DC |
|---|---|---|---|
| Crd | 1 | Repetition request | Rd'. |
| Crs | 2 | Repetition start | Rs'. |
| Ccr | 3 | Data | Cr'. |
| Csy | 4 | Synchronization | Sy'. |

Thus, distinction is made between:

a. The normal words: these are the data words C*cr* and the synchronization words C*sy*, these latter being transmitted by modem DS when the terminal has not other type of word to transmit; and b. The repetition words: The parity digits of the transmitted words enable the detection of transmission errors, and each time an error is detected in a terminal—TA for instance—a repetition request word C*rd* is sent to terminal TB. At the reception of this word, terminal TB retransmits the eight last transmitted words which are stored in a special memory contained in circuitry SL, this retransmission being preceded by a repetition start word C*rs* which indicates to terminal TA that it will receive repeated information.

In a given terminal, the data words delivered by unit QP are transmitted towards the other terminal only if:

a word C*rd* has not just been received, and a word C*rd* must not be sent.

Thus, it is seen that a repetition has priority over the normal transfer of information.

As indicated in Table 1, the word C*sy* has the lowest priority level. However, the speed of transmission is chosen in such a way as to assure a frequent enough transmission of these words which are used for the synchronization of the received clocks in the terminals. A word C*sy* is characterized by the fact that it is alternating between binary 0 and binary 1, i.e., that it furnishes a maximum number of transitions, this being, as is well known, the optimum condition for obtaining a good synchronization.

This synchronization to the digits of the code C*sy* is carried out in receive modem DR and its description is beyond the scope of the present invention. Nevertheless, it should be noted that the signal Sy delivered by analyzer WZ is applied to receive clock CR for controlling the time position of the digit signals in such a way that a signal R1, for instance, appears exactly at the time of receiving the first digit of a word.

In the data transmission system according to the present invention, terminal TA includes transmit clock CS which defines the word times for transmission and terminal TB includes receive clock CR–B synchronized to the received signals. This same clock CR is used for transmission from terminal TB towards terminal TA, but terminal TA includes receive clock CR–A which generate word time signals delayed with respect to those generated by clock CS by a duration equal to the round trip transmission time between terminals TA and TB plus the data processing time in terminal TB.

Thus, the word time signals used for the reception and the transmission are in phase only in terminal TB. Nevertheless, it will be seen in the course of the description, that the circuits RL, SL and WZ are controlled in each terminal by the same digit time slot signals. Therefore, digit time slot signals delivered by clocks CR–A, CR–B and CS will bear the same references T1, T2 . . . T10. All of these 10 signals define one word time.

1.2—Time control circuits

Figure 2:
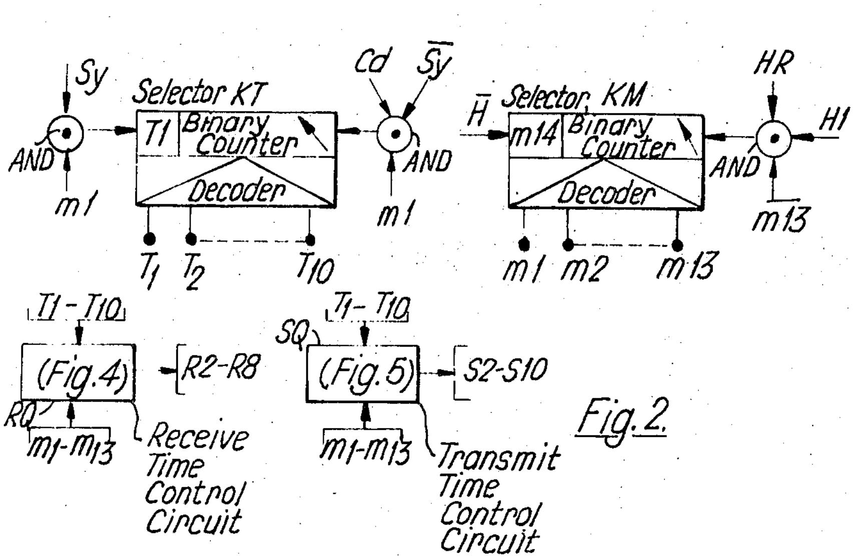
FIG. 2 is a detailed block diagram of a reception clock CR.
Figures 3A, 3B, 3C, 3D, 3E, 3F, 3G:
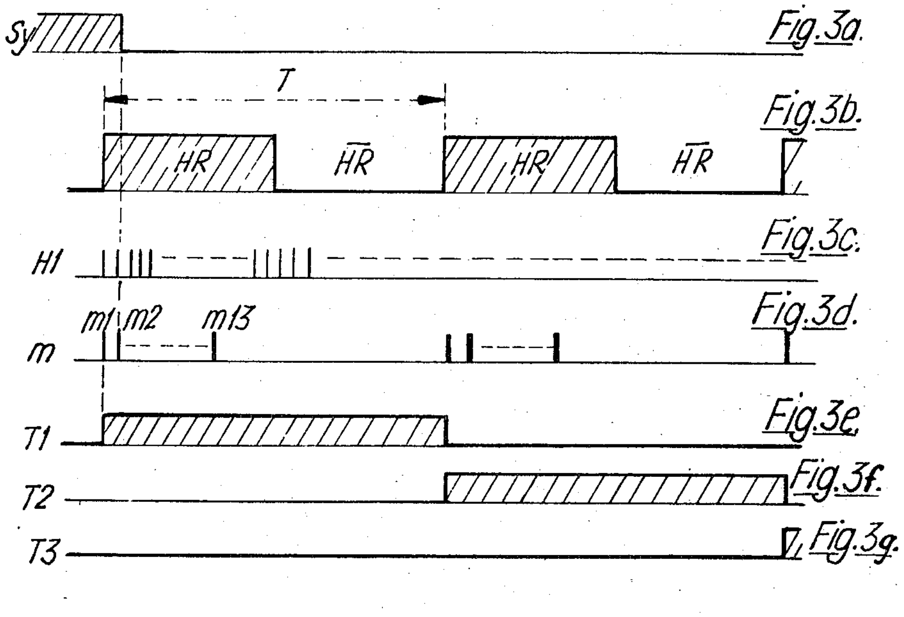
FIG. 3.*a* to 3.*g* are waveforms of signals in the circuit CR of FIG. 2.

The clocks CR and CS will be described with reference to FIG. 2 which illustrates a block diagram of one clock CR and FIGS. 3.*a* to 3.*g* which illustrate the waveform of signals related to both clocks CR.

A clock CR receives the following signals:

Signal Sy (FIG. 3.*a*) obtained by decoding a word C*sy* in word analyzer WZ;

Signal HR (FIG. 3.*b*) which is the digit time slot signal generated in modem DR by the synchronization means mentioned above. The frequency of this signal defines the bit rate over the lines D*ab*, D*ba* and it will be assumed equal, for instance, to 2,400 bauds.

Signal H1 (FIG. 3.*c*) which is a signal of very high frequency F1 delivered by a pulse generator (not shown). Assume that F1=2.5 MHz. (megahertz) so that each signal HR of duty cycle 0.5 corresponds to the transmission of 520 signals H1.

Signal C*d* which is delivered by modem DR and which characterizes the fact that a carrier frequency is received over the associated one of lines D*ba* and D*ab*.

Clock CR–B comprises:

Selector KM including a binary counter and timing signal decoder advances at the rate of the signals H1 for the logical condition HR·H1·*m*13 and defines 14 time positions *m*1, *m*2 . . . *m*14. Its advance occurs under the control of the signals HR and it is blocked when it reaches the position *m*13 so that the signals of fine timing signals it delivers are grouped at the beginning of the signal HR (FIG. 3.*d*). The signal *m*1 defines the beginning of a digit time slot. It will be noted that the signals $m1$, $m2$ . . . $m13$ occupy but a very small part of a digit time slot;

Selector KT including a binary counter and timing signal decoder and defines 10 time positions T1, T2 . . . T10 defining the 10 digit time slots of a word. This selector advances by one position at each time $m1$ for the logical condition $Cd \cdot \overline{Sy} \cdot m1$ and it is forced into position T1 for the condition $Sy \cdot m1$, i.e., when a code $Csy$ has been received. FIGS. 3.*e*, 3.*f* and 3.*g* illustrate the time positions of the signals T1, T2, T3; and The receive time control circuit RQ and the transmit time control circuit SQ which deliver the time control signals used for receiving and transmitting.

Figure 4:
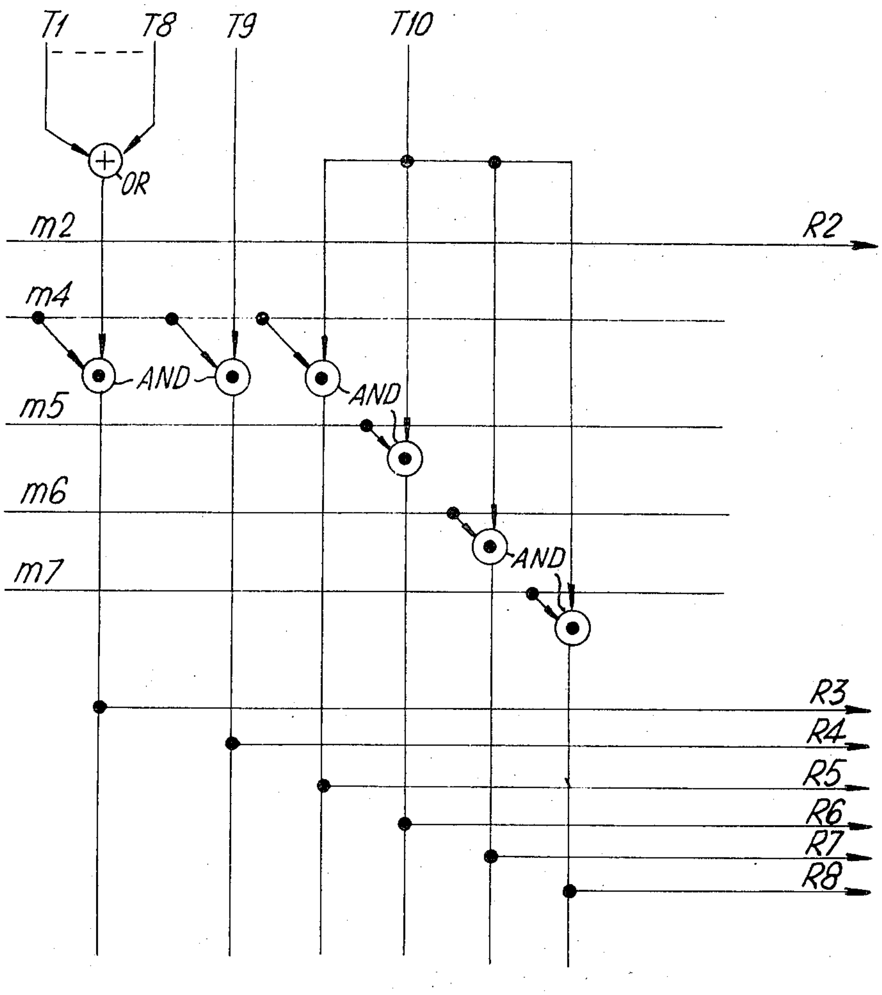
FIG. 4 is a detailed block diagram of the reception time control RQ.
Figure 5:
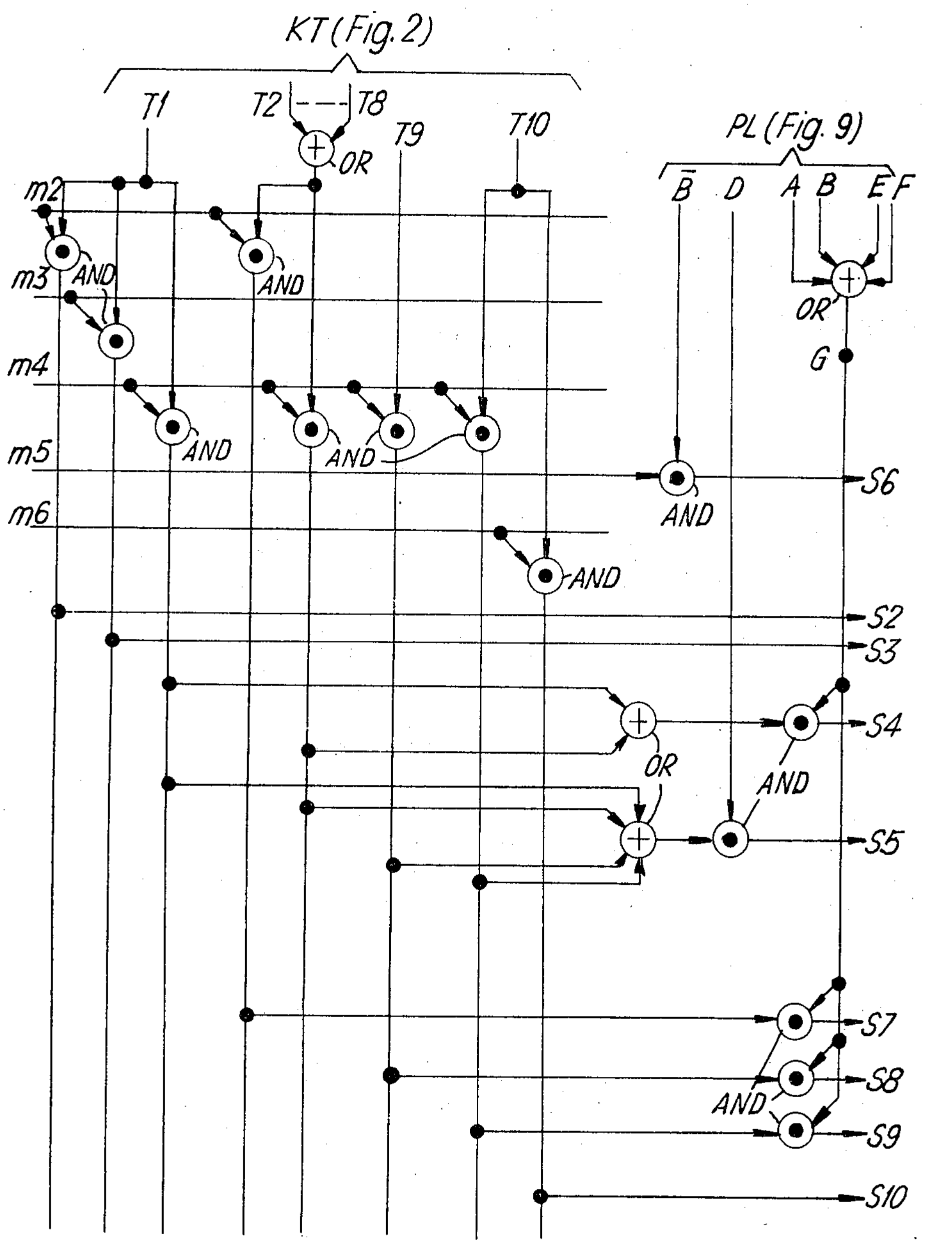
FIG. 5 is a detailed diagram of the transmission time control circuit SQ.

FIGS. 4 and 5 illustrate the detailed block diagram of circuits RQ and SQ, respectively, and the logical conditions set up in these circuits are presented in Tables 2 and 3, respectively, wherein the expression (T1–T8), for example, symbolize the logical condition T1+T2+. . . T8.

It will be noted that the signals A, B, D, E, F applied to the circuit SQ (FIG. 5) are delivered by priority circuit PL which will be described in paragraph 4.2 with respect to FIG. 9.

Clock CR–A comprises the same elements as clock CR–B with the exception of the transmit time control circuit SQ which is controlled by transmit clock CS.

The selectors of clock CS are the same as those shown in FIG. 2, but their control signals are different as follows:

TABLE 2

Time control circuit RQ

| Signal | Condition |
|---|---|
| R2 | m2 |
| R3 | (T1–T8).m4 |
| R4 | T9.m4 |
| R5 | T10.m4 |
| R6 | T10.m5 |
| R7 | T10.m6 |
| R8 | T10.m7 |

TABLE 3

Time control circuit SQ

| Signal | Condition |
|---|---|
| S2 | T1.m3 |
| S3 | T1.m3 |
| S4 | (T1–T8).G.m4 |
| S5 | (T1–T10).D.m4 |
| S6 | $\overline{B}$.m5 |
| S7 | (T2–T8).G.m2 |
| S8 | T9.G.m4 |
| S9 | T10.G.m4 |
| S10 | T10.m6 |

G=A+B+E+F a. For selector KM: The advance condition is: $HS \cdot H1 \cdot \overline{m13}$, the signal HS being the digit time slot signal generated in the modem DS and used to control the transmission over line $Dab$; and b. For selector KT: The signals $Sy$ and $\overline{Sy}$ are not used to control it. In fact, the advance condition is $Cd \cdot m1$ and there is no forcing condition in T1.

1.3—Word analyzer

Figure 6:
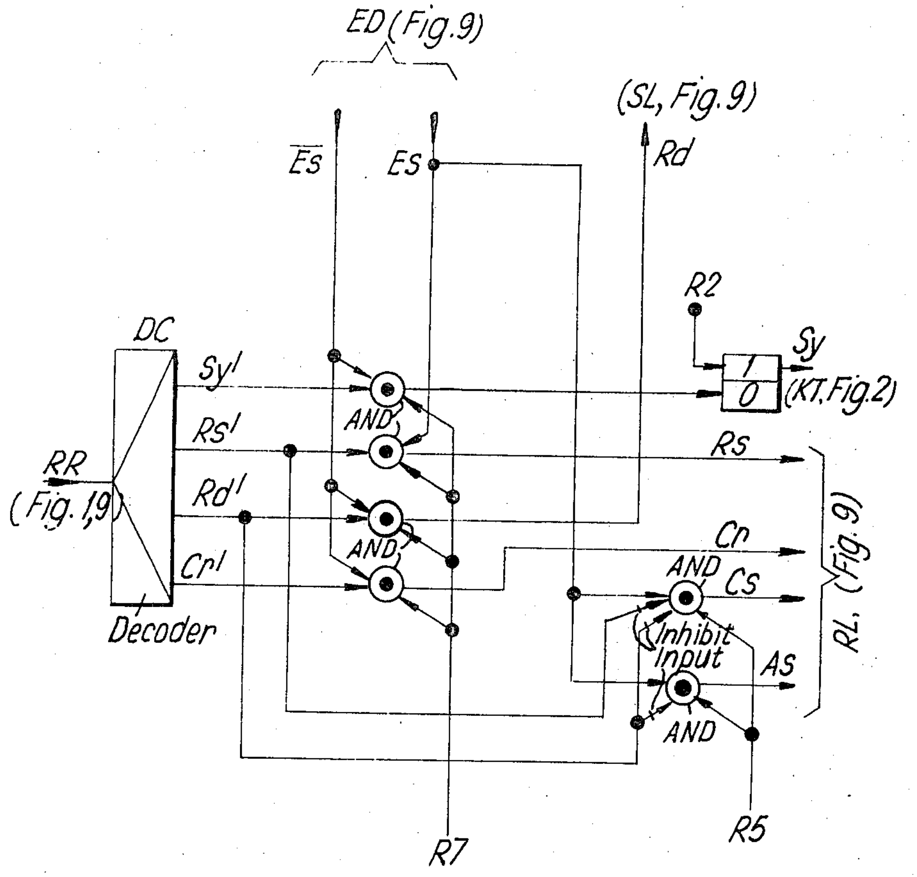
FIG. 6 is a detailed block diagram of the word analyzer WZ.

FIG. 6 illustrates the detailed block diagram of the word analyzer WZ (FIG. 1) which delivers, to the blocks RL and SL (FIGS. 1 and 9), the different orders to be carried out according to the type of word stored in the register RR (see Table 1). Table 4 presents the different logical conditions set up in this circuit and the meaning of the different orders.

The signals $Es$ and $\overline{Es}$ which control the generation of these orders are supplied by error detection circuit ED located in circuitry RL which will be described in paragraph 3.3. It will only be noted that a signal $Es$ appears as soon as an error is detected at the reception and that it is present up to the reception of the eight words sent in repetition by the distant terminal (the seven words which precede the erroneous word plus this word).

TABLE 4

Word analyzer WZ

| Logical conditions | Meaning |
|---|---|
| Sy'.$\overline{Es}$.R7→Sy<br>t2→$\overline{Sy}$ | Beginning of a word time. |
| Rs'.Es.R7=Rs<br>Rs'.$\overline{Rd}$'.Es.R5=Cs | Beginning of the reception of a repetition.<br>Advance order for the word counter KC. |
| Rd'.$\overline{Es}$.R7=Rd<br>$\overline{Rd}$'.Es.R5=As | Local repetition order.<br>Advance order for the alarm counter KA. |
| Cr'.$\overline{Es}$.R7=Cr | Order for sending a word Ccr to the unit QP. |

It will be noted that the orders $Cs$ and $As$ are applied to the counters which control the reception of repeated information. The operation of these counter will be described in paragraph 3.4.

2—Principle of Operation

Figures 7A, 7B, 7C, 7D, 7E, 7F, 7G, 7H, 7I, 7J, 7K:
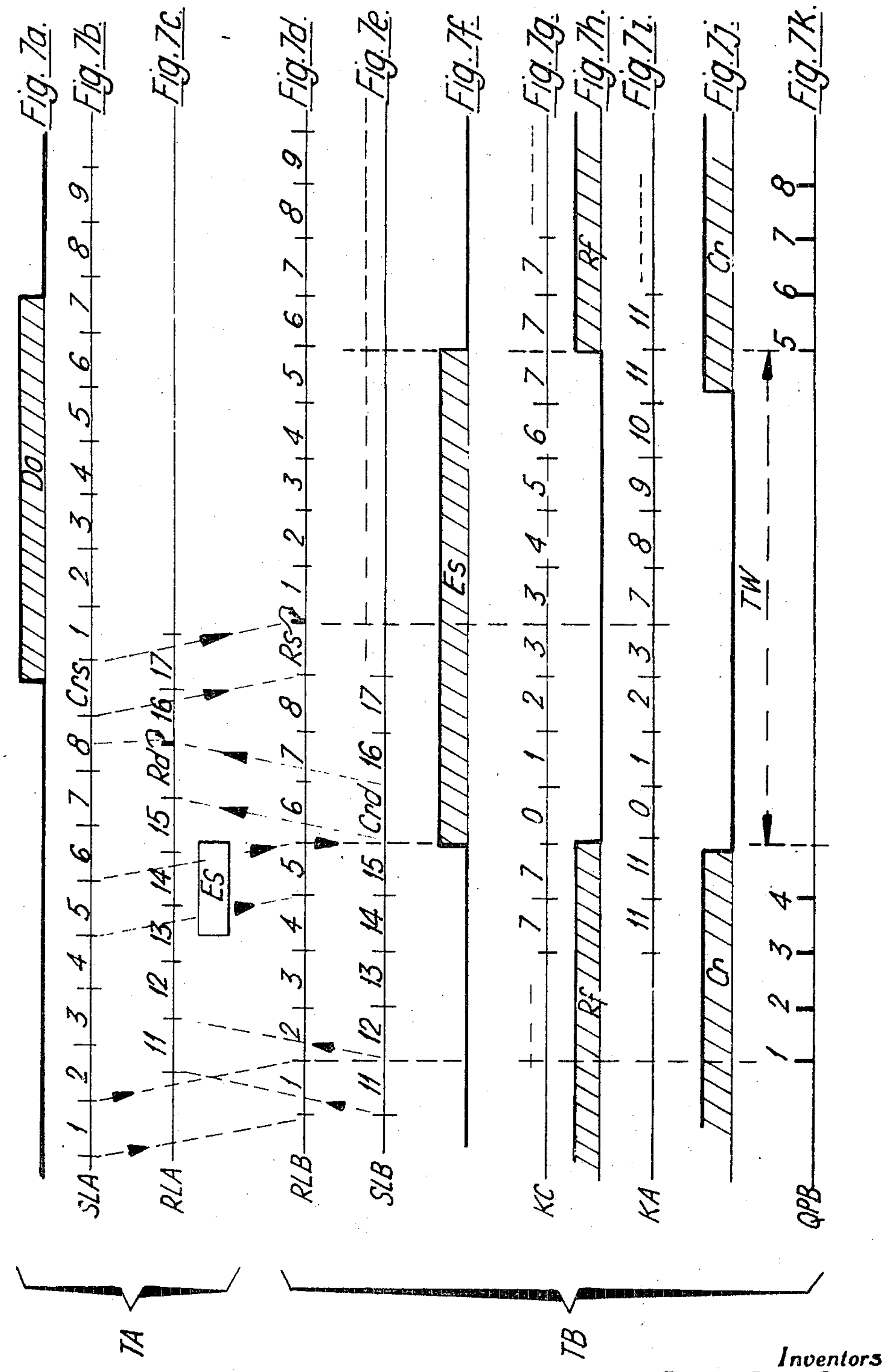
FIGS. 7.*a* to 7.*k* are waveforms of signals related to the operation of the data transmission system of the present invention when an error is detected in terminal TB.

FIGS. 7.*a* to 7.*k* illustrate several waveforms of signals related to the operation of the data transmission system according to the present invention.

FIG. 7.*b* illustrates the word times reserved for transmission by unit SL–A of the words 1, 2, 3 etc. FIG. 7.*d* illustrates the word times reserved for the reception of these words by unit RL–B. These word times bear the same reference as in FIG. 7.*b*, but they are delayed, by way of example, by 0.75 word time in order to take into account the time of propagation between the two terminals TA and TB.

As it has been seen hereabove, the transmission word times in terminal TB are synchronized by the received word times and they are used for the transmission of the words 11, 12, 13 etc., towards the terminal TA (FIG. 7.*e*). On the other hand, in terminal TA, the received word times (FIG. 7.*c*) are not in synchronism with the transmission word times (FIG. 7.*b*).

Under normal operation, the words received in serial form in one terminal (TB, for instance) are transmitted in parallel form, at the end of a word time, to the unit QP–B (FIG. 7.*k*); this transfer being carried out under the control of a signal $Cr$ (FIG. 7.*j*).

The operation of the data system will now be described in the case where an erroneous word is received in the terminal TB. To this end, it shall be assumed that the words 1 to 4 transmitted by terminal TA are normally received in terminal TB (FIG. 7.*d*), but that the checking of the word 5 has shown that it was affected by one or several errors.

An error detection circuit located in the unit RL–B delivers then a signal $Es$ (FIG. 7.*f*) and a signal $Rr$. This error detection controls the following operations:

Suppression of the signal $Cr$ (FIG. 7.*j*) so that the word 5 and the following words are not sent to the unit QP-B;

Clearing of word counter KC (FIG. 7.*g*) giving a signal $\overline{Rf}$ (FIG. 7.*h*); and Clearing of alarm counter KA (FIG. 7.*i*).

During the time that terminal TB is receiving words 1 to 5, terminal TB transmits to terminal TA the words 11 to 15 (FIG. 7.*e*). At the next word time, the normal transmission is blocked and the signal $Rr$ controls the sending of the repetition request word $Crd$. The words 16, 17 etc. . . . are then transmitted normally.

In terminal TA, this word $Crd$ is received after the word 15 (FIG. 7.*c*) and it is sent to word analyzer WZ-A which delivers a signal $Rd$ which is transmitted to transmit logic circuitry SL-A. It is seen (FIG. 7.*b*) that this signal is received during the time of transmission of the word 8 which is normally transmitted as well as the preceding words 1, 2 . . . 7. At the next word time, the signal $Rd$ controls the transmission to terminal TB of a repetition start word $Crs$ followed by the eight preceding words 1 to 8 which were kept in a memory constituted by a shift register having a capacity of 80 digits.

This word is received in terminal TB at the time following the reception of the word 8 (FIG. 7.*d*) and word analyzer WZ-B delivers a signal $Rs$ at the end of this time.

From the time of occurrence of the signal $Es$, counters KA and KC receive an advance signal at each word time so that they are (FIGS. 7.*g* and 7.*i*) in position 3 when the signal $Rs$ appears. This signal blocks the advance of counter KC and controls the setting of counter KA to the position 7.

At the following word times, terminal B receives the repeated words 1, 2 . . . 8 (FIG. 7.*d*) and counter KC advances again normally after having been blocked during two successive word times in the position 3 (FIG. 7.*g*).

By comparing FIGS. 7.*d* and 7.*g*, it is seen that this counter reaches the position 7 at the word time 5 during which terminal TB receives the repetition of the word which had been detected as erroneous. Counter KC delivers then a signal RF (FIG. 7.*h*) which controls the following operations:

Blocking of counter KC in position 7 (FIG. 7.*g*);

Suppression of the signal $Es$ (FIG. 7.*f*); and

Generation of the signal Cr (FIG. 7.*j*) so that the word 5 and the following words are transmitted to the unit QP-B.

It has been seen previously that the detection of an error controlled the advance of alarm counter KA (FIG. 7.*i*). If the word Crs is received within its normal delay which is, according to the diagrams of FIGS. 7.*b* to 7.*e*, 3 word times, the advance of counter KA is blocked and it is set in position 7 by the signal Rs. On the other hand, if this word Crs is not received before counter KA is in position 6, a signal Ad appears which triggers an alarm in terminal TB.

To sum up, when an error has been detected in terminal TB, the signals Es (FIG. 7.*f*), $\overline{Rf}$ (FIG. 7.*h*) and $\overline{Cr}$ (FIG. 7.*j*) define the time during which the transmission of signals to unit QP-B is stopped and the time TW (FIG. 7.*k*) is the waiting time for unit QP-B between the reception of the word 4 and the reception of the word 5 which has been detected as erroneous.

In terminal TA, the time of transmission of the eight repeated words is defined by a signal Do (FIG. 7.*a*).

Figures 8B, 8C, 8D, 8E, 8F, 8G:
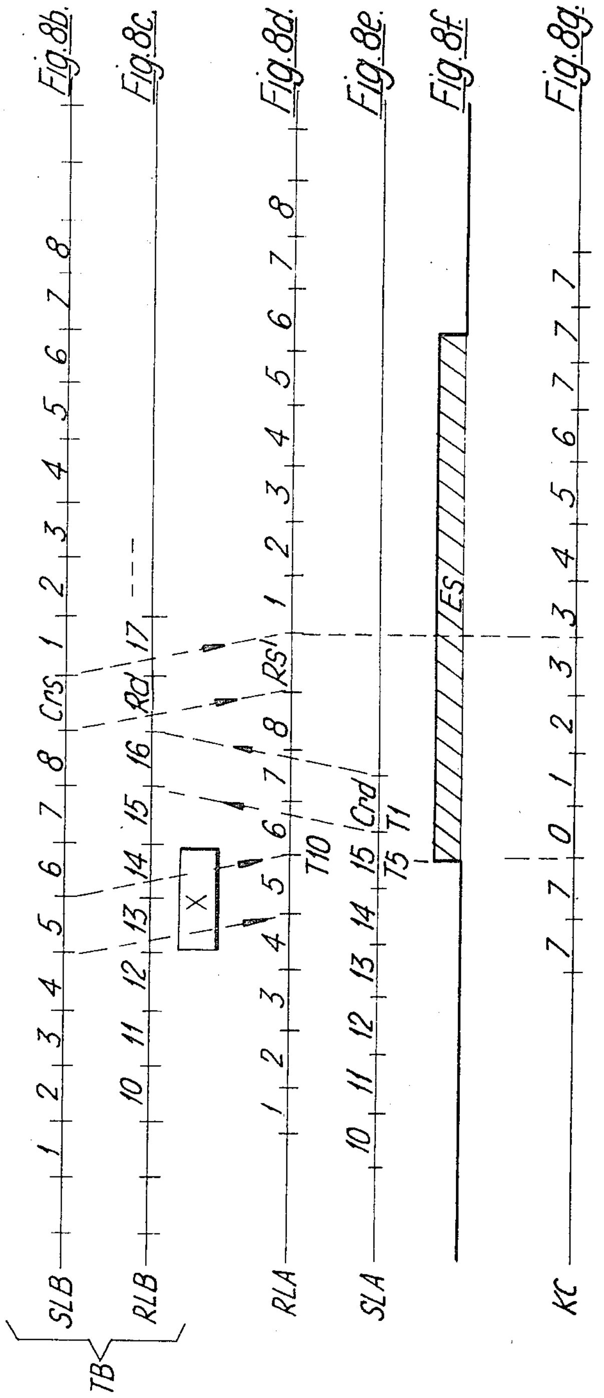
FIGS. 8.*b* to 8.*g* are waveforms of signals related to the operation of the data transmission system of the present invention where an error is detected in terminal TA.
Figure 9:
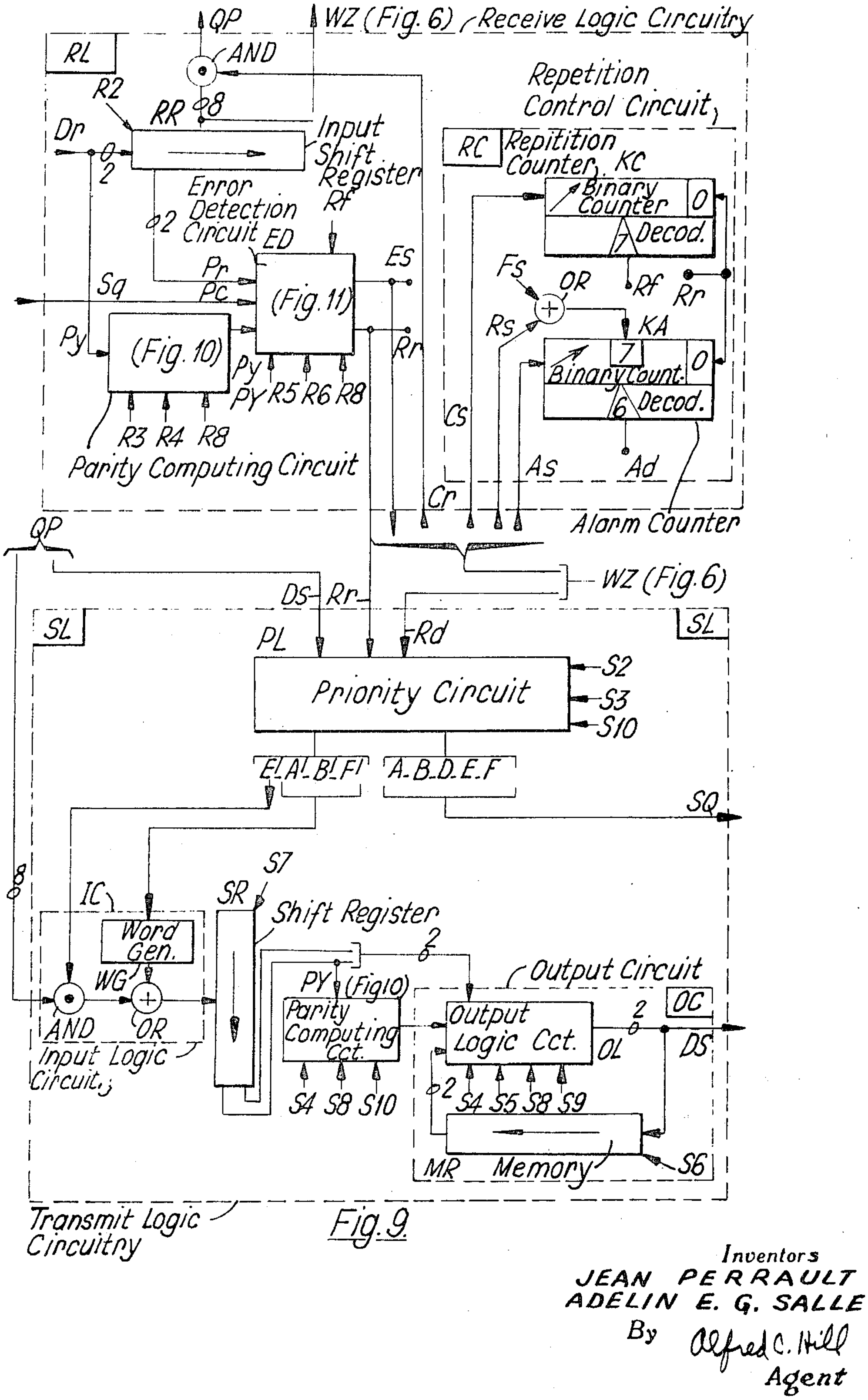
FIG. 9 is a general block diagram of the reception unit RL and of the transmission unit SL.

FIGS. 8.*b* to 8.*g* concern the case where an erroneous word has been received in terminal TA, the word number 5 being assumed to be in error, by way of an example, as in the preceding case. It can be seen that in this case, where the word times are synchronous in RL-B AND SL-B, the word Crs is sent at the word time which follows immediately the reception of the code Crd (FIGS. 8.*b* and 8.*c*).

3—Receive logic circuitry 3.1—General Outline—

As it has been seen in the preceding paragraph, receive logic circuitry RL, which is shown in the upper part of FIG. 9, performs the following functions:

a. Checking of the words received by means of parity check circuit PY and error detection circuit ED;

b. Transfer to unit QP of the information Ccr which are recognized as correct;

c. Transfer to transmit logic circuitry SL of an order Rr (order for transmitting a repetition request word Crd) when an error has been detected; and d. Repetition check by means of circuit RC.

These functions are performed in the following circuits:

Input shift register RR which is a 10-digit shift register receiving the codes supplied by modem DR (FIG. 1) on the input Dr. The transfer of the codes is controlled by the signal R2;

Parity computing circuit PY which will be described in detail in relation with FIG. 10 which delivers the calculated value of the parity digits *b*9 and *b*10 on its output Pc;

Error detection circuit ED which receives the calculated parity digits Pc and the parity digits Pr of the received code which are supplied by register RR. When the digits Pc and Pr are different, this circuit delivers, at the end of the word time, a signal Ry which is applied to circuitry SL as well as an error signal Es which is applied to word analyzer WZ (FIG. 6, Table 4); and Repetition control circuit RC which delivers, first, a signal Rf as long as the reception of the words is normal and the equipment is not in the repetition mode and, second, a signal Ad if a word Crs has not been received with the normal delay after the transmission of a word Crd.

3.2—Parity computing circuit

Figure 10:
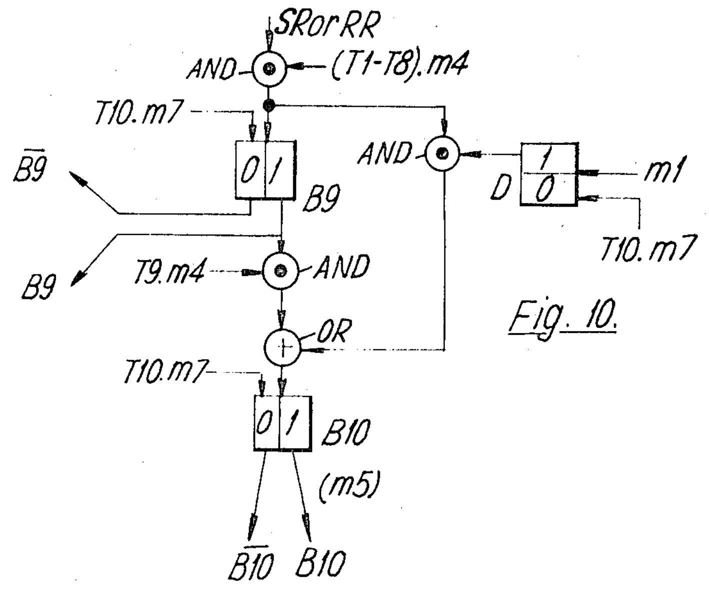
FIG. 10 is a detailed block diagram of the parity check circuit PY.

FIG. 10 illustrates parity computing circuit PY which is placed in each of the transmit and receive logic circuits and which computes the values of the parity digits *b*9 and *b*10.

As it has been seen previously, each word comprises:

Eight information digits *b*1, *b*2 . . . *b*8, occupying the time positions T1, T2 . . . T8; and Two parity digits *b*9 and *b*10 occupying the time positions T9 and T10.

The following rules are chosen for determining the value of these parity digits:

a. The first parity digit *b*9 gives the normal parity of the digits *b*1 to *b*8, its value being chosen equal to 1 if this number comprises an even number of 1 and equal to 0 in the opposite case; and b. The second parity digit *b*10 gives the parity of the odd rank digits *b*1, *b*3, *b*5, *b*7 and *b*9.

This computed parity 2-digit code may present four different values of which only one is correct and it will be shown that it enables detection without any ambiguity, of errors in three consecutive digits.

If, for a given code, the parity code transmitted is 10:

A transmission error in an odd rank digit, such as *b*1, modifies the value of the digits *b*9 and *b*10 and the computed parity code 01;

An in the digits *b*1 and *b*2 does not modify *b*9, but modifies *b*10 and the computed parity code is 11;

An error in the digits *b*1, *b*2 and *b*3 modifies *b*9, but does not modify *b*10 and the computed parity code is 00.

This detection of consecutive errors is very important in a data transmission system wherein the errors occur generally in bursts.

In addition, the computed parity code 00 is obtained for one single error in an even rank digit.

The operation of circuit PY will now be described.

At the end of a word time, in T10·*m*7, flip-flops B9 (which gives the value of the parity digit *b*9), B10 (which gives the value of the parity digit B10) and D (rank of the digits *b*1 to *b*9) are reset. It will be noted that all these flip-flops operate as scale-of-two's, this being symbolized by the signals applied symmetrically, such as the signal *m*1 applied to the flip-flop D. It is thus seen that this flip-flop, which receives one signal at each word time, is in the 1 state for the odd digits *b*1, *b*3 . . . *b*9.

During the time interval T1–T8, the signals supplied by register RR (or SR) are applied to flip-flop B9, the final state of which gives the value, $\overline{B9}$ or B9, of the first parity digit *b*9, through the AND performing the logic function RR·(T1—T8)·*m*4. At the same time, an advance signal is applied to flip-flop B10 at each odd word time (logical condition: D·(T1—T8)·*m*4). In addition, if the digit *b*9 is 1, an additional advance signal is applied to flip-flop B10 in T9 (logical condition : B9·T9·4).

As it may be seen by consulting Tables 2 and 3, the different time control signals used for the calculation of the parity are:

the signals R3, R4 and R8 in receive logic circuitry RL; and the signals S4, S8 and S10 in transmit logic circuitry SL.

3.3 - Error detection circuit

Figure 11:
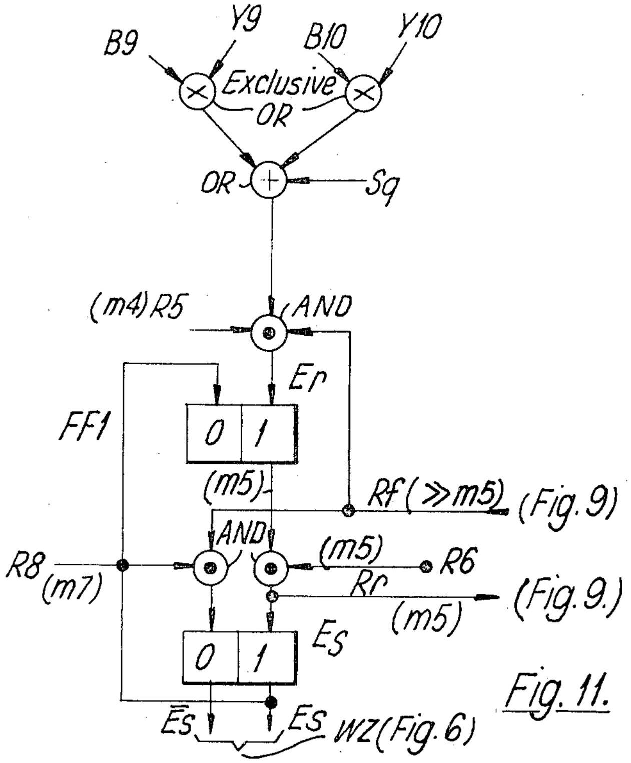
FIG. 11 is a detailed block diagram of the error detection circuit ED.

FIG. 11 illustrates error detection circuit ED and Table 5 presents the different logical conditions. This circuit is controlled by certain signals of receive time control circuit RQ (FIG. 4) and there is shown in FIG. 11, between brackets and near these signals, the fine times at which they appear. There also is shown between brackets

TABLE 5

Error detection circuit ED

| |
|---|
| (B9 × Y9 + B10 × Y10 + Sq). Rf.R5 Er |
| Er.R6=Rr |
| Rr→Es |
| Es→Er |
| Rf.R8→Es |

N.B.—The sign "×" caracterizes the "EXCLUSIVE OR" function.

TABLE 6

Repetition control circuit RC

| | |
|---|---|
| Rr=Er.T10.m5=Er.R6 | Clearing of the counters KA and KC. |
| Cs=$\overline{Rs'}$.$\overline{Rd'}$.Es.T10.m4=$\overline{Rs'}$.$\overline{Rd'}$.Es.R5<br>Rf | Advance signal for counter KC.<br>Introduction of the number 7 in KC. |
| As=$\overline{Rd'}$.Es.T10.m4=$\overline{Rd'}$.Es.R5<br>Ad | Advance signal for counter KA.<br>Introduction of the number 6 in K. |

the fine times at which a flip-flop sets in the state which has been ordered by assuming a switching delay in one fine time.

In Table 5, the logical condition B9×Y9 is equivalent to the condition: B9·$\overline{Y9}$+$\overline{B9}$·Y9 (EXCLUSIVE OR function).

In Table 5, it should be noted that:

a. the signal Sq is an error signal supplied by modem DR (FIG. 1) when the quality of the received signals is estimated insufficient;

b. the signal $R_f$ supplied by counter KC (FIG. 9) when the counter shows the number 7 which characterizes, as has been seen previously with respect to FIGS. 7.*f* to 7.*h*, a normal reception without any error;

the signal $E_r$ means that an error has just been detected in the received word (flip-flop $E_r$ in the 1 state);

d. the signal $R_r$ is sent to transmit logic circuit SL (FIG. 9) for controlling the transmission of a word $C_{rd}$, repetition request; and e. the error signal $E_s$ is present up to the occurrence of a signal $R_f$: the condition $E_s$ is thus present from the detection of error up to the end of the repetition.

3.4—Repetition control circuit

Circuit RC is shown in detail in the upper part of FIG. 9 and its logical conditions are presented in Table 6. It comprises alarm counter KA and repetition counter KC which are cleared by the signal $R_r$ (Table 5) indicating the detection of an error.

Counter KA, which measures the time interval between the detection of an error and the reception of the word $C_{rs}$ (repetition start), comprises four flip-flops and it receives, as advance signals, the signals $A_s$, supplied by word analyzer WZ, appearing at each word time when an error signal $E_s$ is present. When a word $C_{rs}$ is received, the signal $R_s$, supplied by word analyzer WZ, controls the setting of KA into position 7. After this operation, the signals $A_s$ control its advance to the positions 8, 9 etc., (see FIG. 7.*i*).

If this word $C_{rs}$ is not received before counter KA has reached the position 6, an alarm signal $A_d$ appears, meaning that there is an important disturbance on the line or a cutoff.

When the transmission is resumed, a starting signal $F_s$ is applied to the counter to set it in position 7 in order to suppress the signal $A_d$.

Repetition counter KC, which measures the time interval between the detection of an erroneous word and its repeated reception, comprises three flip-flops and it receives, as advance signals, the signals $C_s$, supplied by circuit WZ, at each word time for which an error signal $E_s$ is present. It will be noted that the condition $R_s'$ blocks its advance at the time of reception of the word $C_{rs}$ (see FIG. 7.*g* and generation of $C_s$ in FIG. 6).

Last, it will be noted that the advance of both counters is blocked, in terminal TB, for instance, for the condition $R_d'$ (see generation of $A_s$ and $C_s$ in FIG. 6) so that there is not taken into account, in the measurement of the time intervals, the word time at which a repetition request has been received due to an error detected in the transmission over the line $D_{ba}$ (FIG. 1).

4—Transmit logic circuitry 4.1— General outline

Transmit logic circuitry SL shown at the lower part of FIG. 9 performs the following functions:

a. Choice of the type of word to be transmitted which is made in the priority circuit PL which sets up the priority levels indicated in Table 1;

b. Transfer, in register SR, of the word to be transmitted which is selected by the priority circuit;

c. Generation of the parity digits and transmission of the word; and d. Transmission of the eight words stored in the memory MR, said transmission following the sending of a word $C_{rs}$.

Circuitry SL comprises the following circuits

Shift register SR wherein are stored the words to be transmitted by means of transmission modem DS;

Priority circuit PL which receives the signals $D_s$, $R_r$, and $R_d$ and which supplies, first, the signals A, B, D, E, F, used for the control of transmit time control circuit SQ (Table 3) and, second, the signals A', B', E', F' used for controlling the selection of the type of word to be transmitted. This circuit will be described in paragraph 4.2;

Input logic circuitry IC in which is performed, under the control of the signals A', B', E', F', the selection of the words to be transmitted; Parity computing circuit PY identical to that described in paragraph 3.2; and Output circuit OC comprising output logic circuitry OL and memory MR constituted by an eight word shift register wherein are stored the eight last words transmitted. These words are retransmitted when a repetition is requested.

The circuits IC and OC will be described in paragraph 4.3.

4.2—Priority circuit

Figure 12:
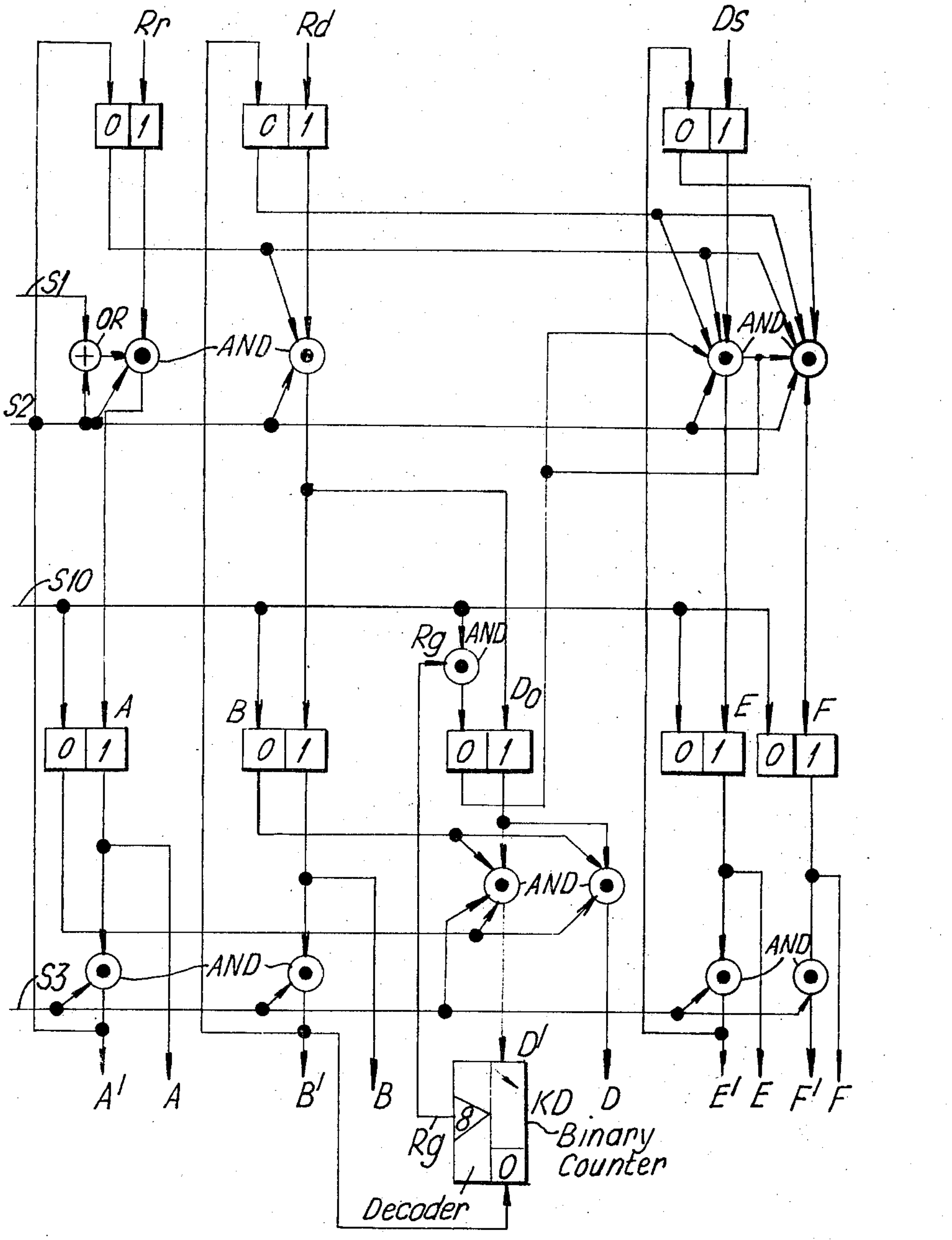
FIG. 12 is a detailed block diagram of the priority circuit PL.
Figure 13:
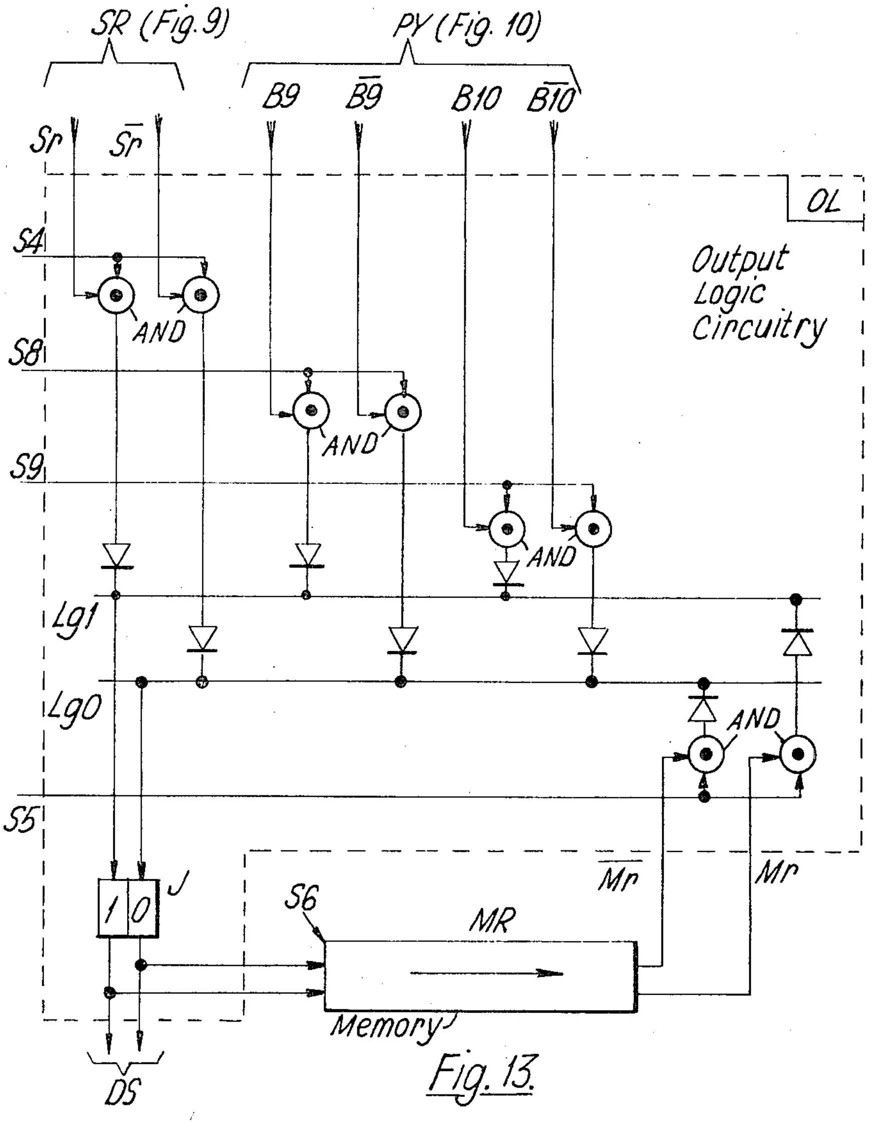
FIG. 13 is a detailed block diagram of the output logic circuit OL in circuit SL.

Priority circuit PL is shown in detail in FIG. 12 and the logical conditions are presented in Table 7. Circuit PL receives the following signals:

The signal $D_s$ supplied by unit QP when an information word $C_{cr}$ is available for transmission;

The signal $R_r$ supplied by error detector ED of the reception unit RL (Table 5) when an error has been detected and a repetition request word $C_{rd}$ must be transmitted; and The signal $R_d$ supplied by analyzer WZ when a repetition request word has been received (Table 4) and a repetition start word $C_{rs}$ must be transmitted followed by the eight words stored in memory MR.

These signals are stored in the input flip-flops bearing the same references and the priority is set up, at the beginning of the following word time, by the transfer—in $T1 \cdot m2$ (signal S2)—of one of these signals into the appropriate associated one or ones of priority flip-flops A, B, $D_o$, E, F.

As may be seen on Table 1, the priority of the types of words to be transmitted is set up as follows, starting with the highest level:

Repetition request word $C_{rd}$,
Repetition start word $C_{rs}$,
Information word $C_{rr}$,
Synchronization word $C_{sy}$.

In $T1 \cdot m3$ (signal S3), one of the signals A', B', E', F' which controls, in circuit IC (FIG. 9), the selection of the type of words to be transmitted, is generated. At the next fine time, the input flip-flops are reset to the O state. Last, in $T10 \cdot m6$ (signal S10), the priority flip-flops receive a resetting signal. It is thus seen that the priority flip-flop which has been set to the 1 state in $T1 \cdot m2$ (signal S2) remains in this state up to $T10 \cdot m6$, so that the condition G=A+B+E+F is present during all this time for controlling the generation of the signals S4, S7, S8 and S9 (FIG. 5 and Table 3).

When the logical condition $R_d \cdot \overline{R_r} \cdot S2$ is satisfied, flip-flop $D_o$ is set to the 1 state at the same time as flip-flop B. This latter flip-flop controls through signal B' the sending of the code $C_{rs}$ and flip-flop D remains in the 1 state during the time required for the transmission of the code $C_{rs}$ and of the eight repeated words extracted from memory MR. This time interval is measured by the counter KD which is cleared at the time $T1 \cdot m3$ (signal B') of the word time reserved to the transmission of the word $C_{rs}$ and which receives an advance signal D' at each time $T1 \cdot m3$ corresponding to the transmission of a repeated word. When counter KD is in position 8, at time $T1 \cdot m4$ of the last repeated word, it supplies a signal $R_g$ which controls the setting flip-flop $D_o$ to the 0 state (condition $\overline{D_o}$) and the suppression of the signal D'.

4.3—Input and output logic circuits

As it has been seen hereabove, input logic circuit IC (FIG. 9)

TABLE 7

Priority circuit PL

| Time | Logical conditions | Remarks |
|---|---|---|
| T1.m2 | $Rr.S1 \rightarrow A$<br>$Rd.\overline{Rr}.S2 \rightarrow B, Do$<br>$Ds.\overline{Rr}.\overline{Rd}.\overline{Do}.S2 \rightarrow E$<br>$\overline{Rr}.Rd.\overline{Ds}.\overline{Do}.S2 \rightarrow F$<br>$Do.\overline{A}.\overline{B}.=D$ | Control of the transmission time control circuit SO (Table 3). |
| T1.m3 | $A.S3=A'$<br>$B.S3=B'$<br>$E.S3=E'$<br>$F.S3=F'$<br>$Do.\overline{A}.\overline{B}.S3=D'$ | Transfer of a repetition request word Crd in the register SR.<br>Transfer of a repetition start word Crs in the register SR.<br>Transfer of a word Ccr in the register SR.<br>Transfer of a word Csy in the register SR. |
| T1.m4 | $A' \rightarrow \overline{Rr}$<br>$B' \rightarrow \overline{Rd}$<br>$E' \rightarrow \overline{Ds}$ | Command in T1.m3. |
| T10.m6 | $S10 \rightarrow \overline{A}, \overline{B}, \overline{E}, \overline{F}$,<br>$S10.Rg \rightarrow Do$ | |

TABLE 8

Control conditions for the output flip-flop J

| Data | Time available for storage | Control time |
|---|---|---|
| $Sr\text{-}\overline{Sr}$ | m3 to m2 | $S4=(T1\text{-}T8).G.m4$ |
| $B9\text{-}\overline{B9}$ | T8.m5 to T10.m6 | $S8=T9.G.m4$ |
| $B10\text{-}\overline{B10}$ | T9.m5 to T10.m6 | $S9=T10.G.m4$ |
| $Mr\text{-}\overline{Mr}$ | m6 to m5 | $S5=(T1\text{-}T10).D.4$ |

controls the transfer, to the register ST, of the word to be transmitted, the selection being carried out under the control of one of the signals A', B40 , E' or F' appearing at time S3=T1·3.

When priority circuit PL delivers a signal E' which can appear only if unit QR delivers a signal *Ds* meaning that a word *Ccr* is ready for transmission, said circuit PL controls the transfer of the word *Ccr* into register SR. When circuit PL delivers one of the selection signals A', B' or F', this signal is applied to word generator WG which transfers the requested word *Crd*, *Crs* or *Csy* into register SR. Such a word generator is well known and will not be described in detail.

FIG. 13 illustrates the detailed diagram of output circuit OC in which logic circuit OL comprises, first, AND circuits controlled by the signals S4, S5, S8, S9, second, two 4-input OR circuits represented by diodes with the outputs thereof being referenced *Lg*0 and *Lg*1 and, third, the flip-flop J controlled by outputs *Lg*0 and *Lg*1.

Circuitry OL receives the following signals:

- Signals *Sr* of $\overline{Sr}$ which appear on the outputs 0 and 1 of the last stage of register SR (FIG. 9);
- Signals B9 or $\overline{B9}$ and $\overline{B10}$ which are delivered by parity circuit PY (FIG. 10); and
- Signals *Mr* or $\overline{Mr}$ which appear on the outputs 0 and 1 of the last stage of memory MR.

Table 8 shows the conditions for the storage of the digits in the output flip-flop J which controls the coupling of the digits, first, to modem DS and, second, to the memory MR.

If one considers the information digits stored in register SR under the control of the signal S3=T1·*m*3, the first digit B1 is available from time T1·*m*4 on and it is stored in flip-flop J under the control of the signal S4. The signal S7 controls, at the following time *m*2, the advance by one position in register SR and the digit B2 is available from the time T2·*m*3 up to the time T3·*m*2 and it is stored in the flip-flop J in T2·*m*4, etc.

Last, the storage conditions of the parity digits B9 and B10 are deduced directly from Table 8.

While I have described above the principles of my invention in connection with specific apparatus, it is to be clearly understood that this description is made only by way of example, and not as a limitation to the scope of my invention as set forth in the objects thereof and in the accompanying claims.

We claim:

1. A bidirectional data transmission system including two terminal stations in bidirectional communication with each other having error correction capability comprising:
   - first means disposed in each of said stations to process data words before transmission and after reception;
   - second means disposed in at least one of said stations to store the last *m* data words transmitted, where *m* is an integer greater than one;
   - third means disposed in at least the other of said stations to receive said data words from said one of said stations and to detect errors in said received data words;
   - fourth means disposed in at least said other of said stations coupled to said third means and said first means responsive to a detected error in said received data words to block said received data words from said first means and to provide for transmission to said one of said stations a repetition request word; and
   - fifth means disposed in at least said one of said stations coupled to said second means responsive to said repetition request word received from said other of said stations to provide for transmission to said other of said stations for error correction therein a repetition start word and said last *m* data words;
   - each of said data words, said repetition request words and said repetition start words including
     - *n*1 information digits, where *n*1 is an integer greater than one, and
     - *n*2 parity digits, where *n*2 is an integer greater than one;
     - said third means including
       - a parity computing circuit responsive to said *n*1 information digits to compute the parity thereof,
       - an error detection circuit coupled to said computing circuit responsive to said *n*2 received parity digits and said computed parity to detect errors in said received words; and
       - a repetition control circuit including
         - a plural binary stage repetition counter, and
         - a plural binary stage alarm counter,
         - both of said counters advancing one count at each word time following the detection of an error.

2. A system according to claim 1, wherein said one of said stations also includes said third means and said fourth means and said other of said stations also includes said second means and said fifth means to provide error correction capability for the other direction of data transmission.

3. A system according to claim 1, further including
   - a first clock disposed in said one of said stations to control the transmission of words therefrom;
   - a second clock disposed in said other of said stations synchronous with said first clock to control the transmission of words therefrom; and
   - a third clock disposed in said one of said stations to control the reception of words therefrom, the timing signals of said third clock being identical to the timing signals of said first clock, but delayed with respect thereto an amount corresponding to the round trip propagation time between said stations plus the data processing time of said other of said stations.

4. A system according to claim 1, further including
   - means to provide synchronizing words, and
   - means to provide said synchronizing words for transmission in the absence of said data words, said repetition request words, and said repetition start words.

5. A system according to claim 1, wherein said fourth means includes sixth means responsive to said received words to distinguish between said data words and said repetition start words, seventh means coupled to said sixth means and said third means responsive to said detected error and an output signal from said sixth means to provide said repetition request word for transmission, and eighth means coupled to said sixth means and said third means responsive to another output signal from said sixth means to block said received data words from said first means.

6. A system according to claim 1, wherein said fifth means includes sixth means responsive to said received words to distinguish between said data words and said repetition request words, and seventh means coupled to said sixth means and said second means to provide for transmission of said repetition start word and said last $m$ data words.

7. A system according to claim 1, wherein said fourth means includes sixth means responsive to said received words to distinguish between said data words and said repetition start words and produce a plurality of output signals, seventh means to said third and sixth means responsive to said detected error and one of said plurality of output signals to provide said repetition request word for transmission, and eighth means coupled to said sixth means and said third means responsive to a second one of said plurality of output signals to block said received data words from said first means;

said third means includes a parity computing circuit responsive to said $n1$ information digits to compute the parity thereof.

an error detection circuit coupled to said computing circuit responsive to said $n2$ received parity digits and said computed parity to detect errors in said received words, a repetition counter coupled to said detection circuit and said sixth means responsive to a detected error and a third one of said plurality of output signals to advance one count at each word time following the detection of an error, and an alarm counter coupled to said detection circuit and said sixth means responsive to a detected error and fourth and fifth ones of said plurality of output signals to advance one count at each word time following the detection of an error; and fifth means includes ninth means responsive to said received words to distinguish between said data words and said repetition request words, and tenth means coupled to said ninth means and said second means to provide for transmission of said repetition start word and said last $m$ data words.

* * * * *